(12) United States Patent
Johnson et al.

(10) Patent No.: US 6,599,655 B2
(45) Date of Patent: Jul. 29, 2003

(54) PROCEDURE FOR PERFORMING BATTERY RECONDITIONING ON A SPACE VEHICLE DESIGNED WITH ONE BATTERY

(75) Inventors: Philip Stanley Johnson, Torrance, CA (US); Glenn Michael Gabor, Hawthorne, CA (US); Christopher Romeyn Ashley, Hermosa Beach, CA (US); Harout Vram Ayvazian, Azusa, CA (US)

(73) Assignee: The Boeing Company, Seattle, WA (US)

( * ) Notice: Subject to any disclaimer, the term of this patent is extended or adjusted under 35 U.S.C. 154(b) by 282 days.

(21) Appl. No.: 09/827,480

(22) Filed: Apr. 6, 2001

(65) Prior Publication Data

US 2002/0146617 A1 Oct. 10, 2002

(51) Int. Cl.$^7$ ............................................. H01M 10/44
(52) U.S. Cl. ........................ 429/50; 429/123; 429/150; 320/116; 320/117; 320/119; 320/122
(58) Field of Search .......................... 429/50, 123, 150; 320/109, 110, 112, 116, 117, 119, 120, 122

(56) References Cited

U.S. PATENT DOCUMENTS

| | | |
|---|---|---|
| 3,997,830 A | 12/1976 | Newell et al. |
| 5,488,282 A | 1/1996 | Hayden et al. |
| 5,825,155 A * | 10/1998 | Ito et al. .................... 320/16 |
| 5,880,575 A * | 3/1999 | Itou et al. ................. 320/122 |
| 6,014,013 A * | 1/2000 | Suppanz et al. ........... 320/122 |
| 6,034,506 A * | 3/2000 | Hall ........................... 320/117 |
| 6,046,514 A * | 4/2000 | Rouillard et al. ......... 320/122 |
| 6,121,752 A * | 9/2000 | Kitahara et al. .......... 320/122 |
| 6,157,165 A * | 12/2000 | Kinoshita et al. ......... 320/116 |
| 6,211,650 B1 * | 4/2001 | Mumaw et al. ........... 320/122 |
| 6,262,558 B1 * | 7/2001 | Weinberg .................. 320/101 |
| 6,262,561 B1 * | 7/2001 | Tahkahashi et al. ...... 320/122 |
| 6,265,846 B1 * | 7/2001 | Flechsig et al. .......... 320/116 |
| 6,271,646 B1 * | 8/2001 | Evers et al. ............... 320/122 |
| 6,373,225 B1 * | 4/2002 | Haraguchi et al. ........ 320/122 |

* cited by examiner

Primary Examiner—Bruce F. Bell
(74) Attorney, Agent, or Firm—DiPinto & Shimokaji, PC

(57) ABSTRACT

A method of reconditioning a battery having a plurality of cells in a plurality of packs comprises electrically connecting the plurality of packs in series. A selected pack for reconditioning is electrically isolated from the remaining packs. A current produced by the battery is bypassed around the pack to be reconditioned by a bypass circuit. The selected pack is discharged. While being discharged, the current produced by the remaining battery is passed to an electrical load. Upon discharging, the selected pack is recharged.

34 Claims, 3 Drawing Sheets

PROCEDURE FOR PERFORMING BATTERY RECONDITIONING ON A SPACE VEHICLE DESIGNED WITH ONE BATTERY

This invention was made with Government support awarded by the Government. The Government has certain rights in this invention.

BACKGROUND OF THE INVENTION

1. Field of the Invention

The present invention relates to apparatus and methods for reconditioning secondary sources of power and, more particularly, to a spacecraft secondary source having only a single battery that includes multiple packs such that one pack can be reconditioned while the remaining packs are operable.

2. Description of Related Art

Terrestrial and non-terrestrial vehicles that are solar powered typically include a secondary source of power that is available when solar power is unavailable. In particular, satellites and other space vehicles normally include an array of solar cells that convert solar energy to electrical energy and provide the primary source of power for operating the various onboard electrical loads. Rechargeable batteries are provided as a secondary source of electrical power when solar energy is not available or is insufficient. Thus, the solar cells provide electrical power during the sunlight portions of an orbit while the rechargeable batteries provide power during the dark portions of an orbit. These dark portions can be significant, particularly for a low earth orbit (LEO) where there is an eclipse almost every orbit.

Having the capability to perform battery reconditioning (i.e., deep discharging and recharging) is important to minimize risk of a battery failure before completion of the space vehicle design life. Reconditioning is also used to understand battery state-of-health so satellite operators are not surprised with a failing battery. Because of battery stresses characteristic of LEO operations, essentially all space vehicles flying in LEO have the capability to perform battery reconditioning. There are some LEO space vehicles that, because of mission constraints, must have battery availability for space vehicle operations such that there is no opportunity to take a battery off-line to perform reconditioning and still support mission operations.

Space vehicles have been designed with more than one battery to achieve battery reconditioning capability and LEO operation. One battery can then be taken off-line for reconditioning while the remaining batteries provide power. As an example, U.S. Pat. No. 3,997,830 discloses each battery reconditioned in sequence so that part of the secondary energy storage capacity is always maintained online for power demands that might occur during the reconditioning process. The individual cells of a battery are discharged simultaneously by connecting resistors across the cell. The terminal voltage of the battery being reconditioned is monitored and when a predetermined low level is reached the battery is connected to the solar array through battery charging circuitry and recharged. A major drawback to the multiple battery design is that the additional battery or batteries and associated charge and discharge electronics represents a significant weight and cost penalty.

A single battery that provides a secondary source of power for spacecraft electrical loads is shown in U.S. Pat. No. 5,488,282, assigned to the assignee of the present invention. The battery includes serially connected packs each including serially connected cells. Reconditioning resistors are connected across the individual packs through switches to discharge the packs when reconditioning is needed. After a pack is discharged, its reconditioning resistor is disconnected and all packs are simultaneously recharged. Each pack is sequentially reconditioned. While providing advantages, the design does not allow one pack to be reconditioned while the remaining packs provide power.

As can be seen, there is a need for an improved reconditionable battery having multiple packs. A reconditionable battery and method of reconditioning is needed wherein one pack can be reconditioned while the remaining packs are left on-line to provide current to a load. Another need is for a reconditionable battery and method of reconditioning that is low in cost and simple in manufacturing. A further need is for a reconditionable battery and method of reconditioning that is effective for space vehicles, particularly ones in LEO.

SUMMARY OF THE INVENTION

In one aspect of the present invention, a method of reconditioning a battery having a plurality of cells in a plurality of packs comprises electrically connecting the plurality of packs in series; bypassing a current produced by the battery around one of the packs; discharging the one pack; passing the current from at least another of the packs to an electrical load while discharging the one pack; and recharging the one pack.

In another aspect of the present invention, a method of reconditioning a battery having a plurality of cells in a plurality of packs in series comprises electrically connecting the plurality of cells in series; electrically isolating one of the cells; bypassing a current produced by the battery around the one cell; discharging the one cell; and recharging the one cell.

In yet another aspect of the present invention, a method of powering a space vehicle comprises generating power from solar cells when the vehicle receives sunlight; and generating power from a single battery when the vehicle cannot receive sunlight, with the battery including a plurality of packs in series; an isolation circuit associated with at least one of the packs; a bypass circuit associated with the one pack; and a reconditioning circuit associated with the one pack.

More particularly, the present invention allows a terrestrial or non-terrestrial vehicle, for example, with a single battery to perform battery reconditioning. In a non-terrestrial vehicle or space vehicle, the present invention allows operation (and in any orbit in the case of a space vehicle) with the ability to perform battery reconditioning. The single battery is composed of separate packs in series. An isolation relay circuit is between each pack and allows each pack to be isolated from the other packs. A bypass circuit across the isolated pack allows for current flow around the isolated pack, providing continued operation of the battery for support of mission operations. The isolated battery pack is then reconditioned using reconditioning circuitry while leaving enough battery capacity online to support the vehicle mission. Each battery pack is sequentially reconditioned until the entire battery has been reconditioned. The present invention is tolerant of a single failure.

These and other features, aspects and advantages of the present invention will become better understood with reference to the following drawings, description, and claims.

DESCRIPTION OF THE PREFERRED EMBODIMENTS

While the present invention is particularly useful in the context of space vehicles flying in LEO that have limited periods of available solar power, the invention is not so limited. For example, the present invention may be applied to space vehicles in orbits other than LEO. Further, even though the preferred embodiments of the present invention are described in the context of space or non-terrestrial vehicles, the present invention can be utilized in terrestrial vehicles, as well as in contexts other than vehicles.

Figure 1:
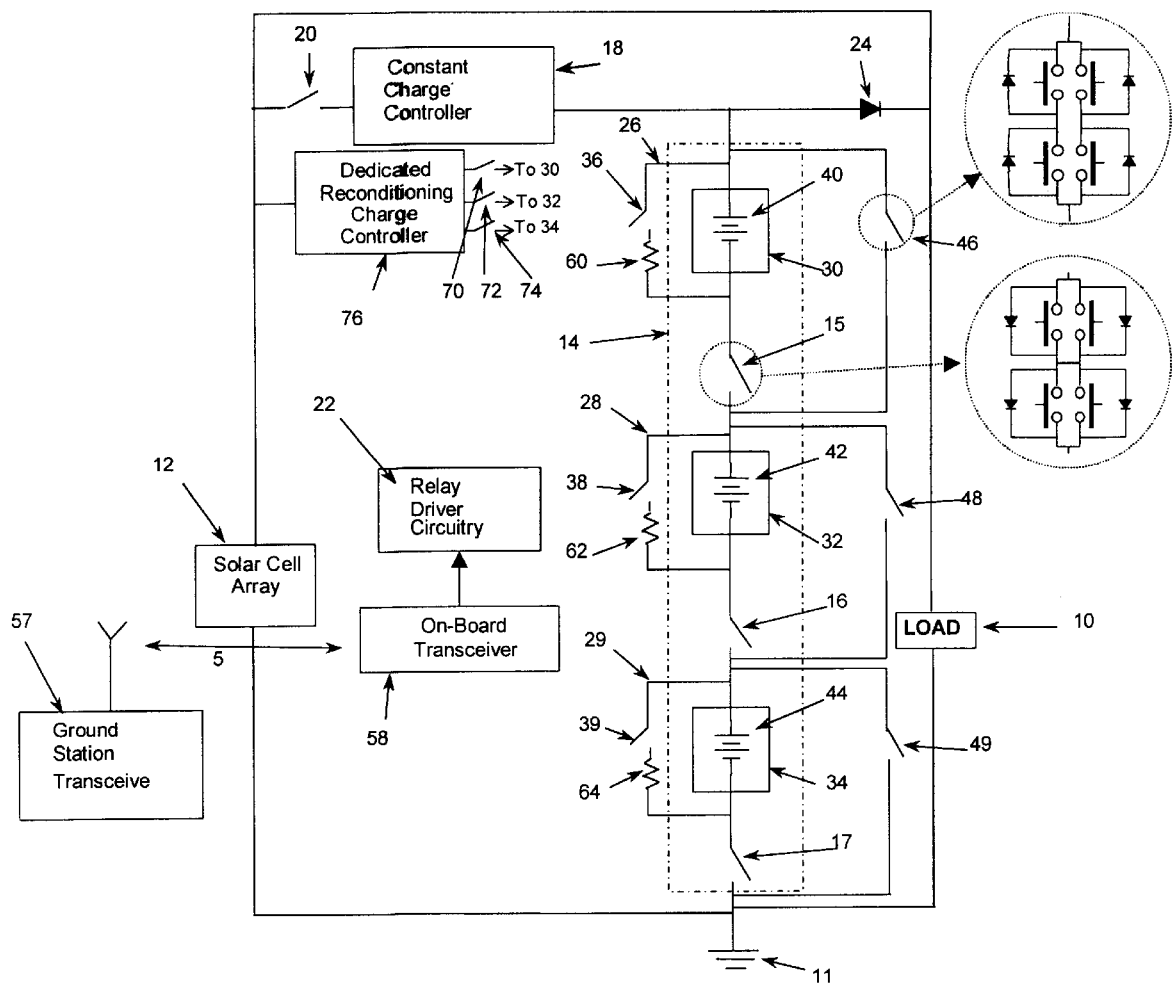
FIG. 1 is a block diagram of one embodiment of the present invention.
Figure 3:
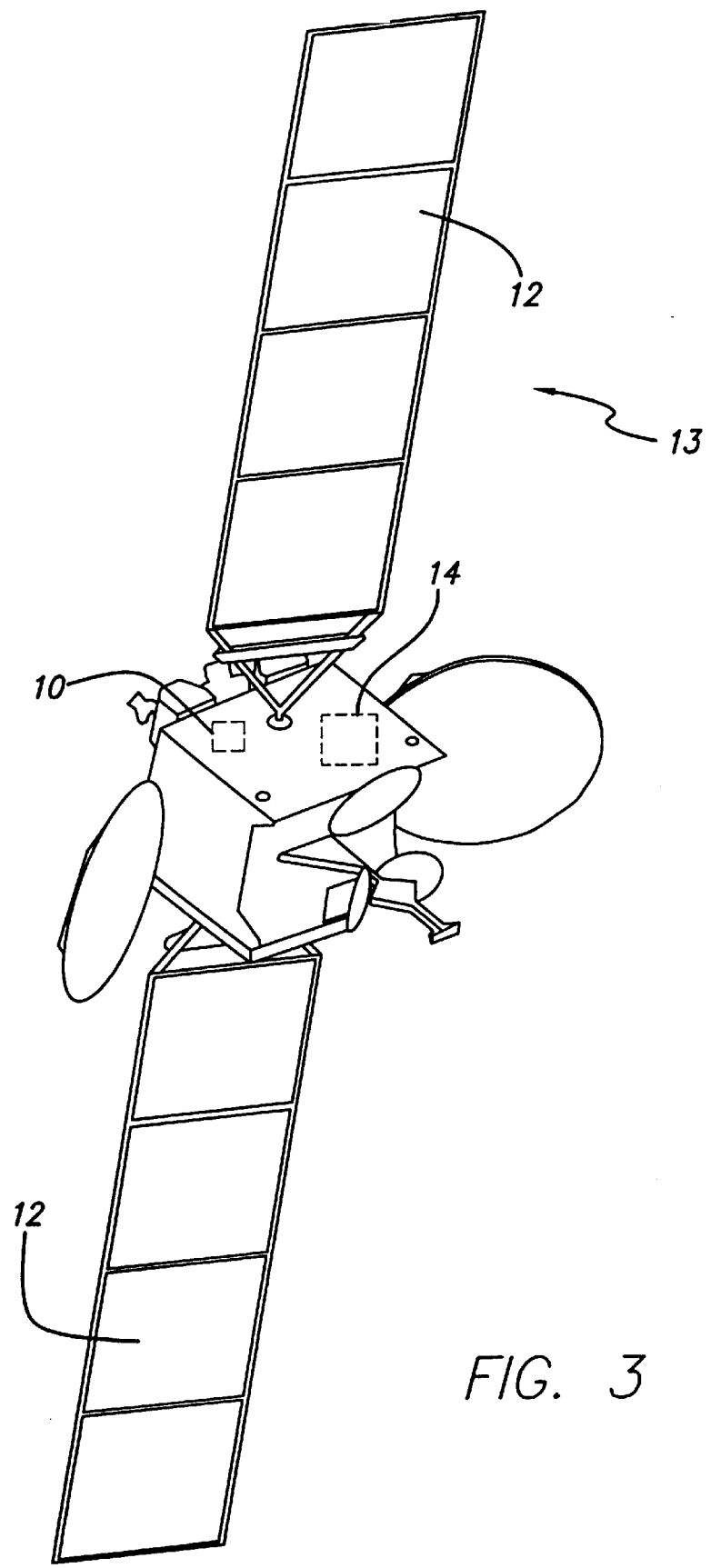
FIG. 3 is a perspective view of a satellite employing an embodiment of the present invention.

A spacecraft 13, for example, can have an electrical load(s) 10 as shown in FIGS. 1 and 3. The primary source of power for the load 10 is provided by a solar cell array 12. A secondary or auxiliary source of power is provided by a battery 14 and designated by the dashed lines (FIGS. 1 and 3). The battery 14 is connected with and charged from a constant current charge controller 18, which is connected to the solar cell array 12 through a charging switch 20 under the control of relay circuitry 22.

Normally, power is supplied to the load 10 from the solar cell array 12 but may be supplied as needed by the battery 14 through a load diode 24. Thus, in the context of a spacecraft, power can be supplied by the solar cell array 12 during the solstice (i.e., the presence of sunlight) and by the battery 14 during an eclipse of the sun (i.e., the absence of sunlight). In any event, the load diode 24 may be replaced with circuitry which regulates the battery 14 discharge voltage while also allowing current flow in one direction only.

In this one embodiment, the battery 14 comprises a plurality of serially connected first, second and third packs 30, 32, 34, each of which includes a plurality of serially connected first, second and third cells designated 40, 42, 44. While the embodiment shown in FIG. 1 includes three packs, the number can vary. Likewise, while the number of cells in each pack 30, 32, 34 can vary, only two are shown for purposes of illustration.

A communication link 5 with the spacecraft is established by a microprocessor based ground station transceiver 57 and a microprocessor based onboard transceiver 58. Battery state of charge is monitored, e.g., for a nickel-hydrogen battery, cell pressure may be used to monitor battery state of charge. The state of charge information from battery sensors (not shown) are input to the onboard transceiver 58 and transmitted to the ground transceiver 57 so that the state of charge of the various packs 30, 32, 34 can be continuously monitored by ground station personnel.

Figure 2:
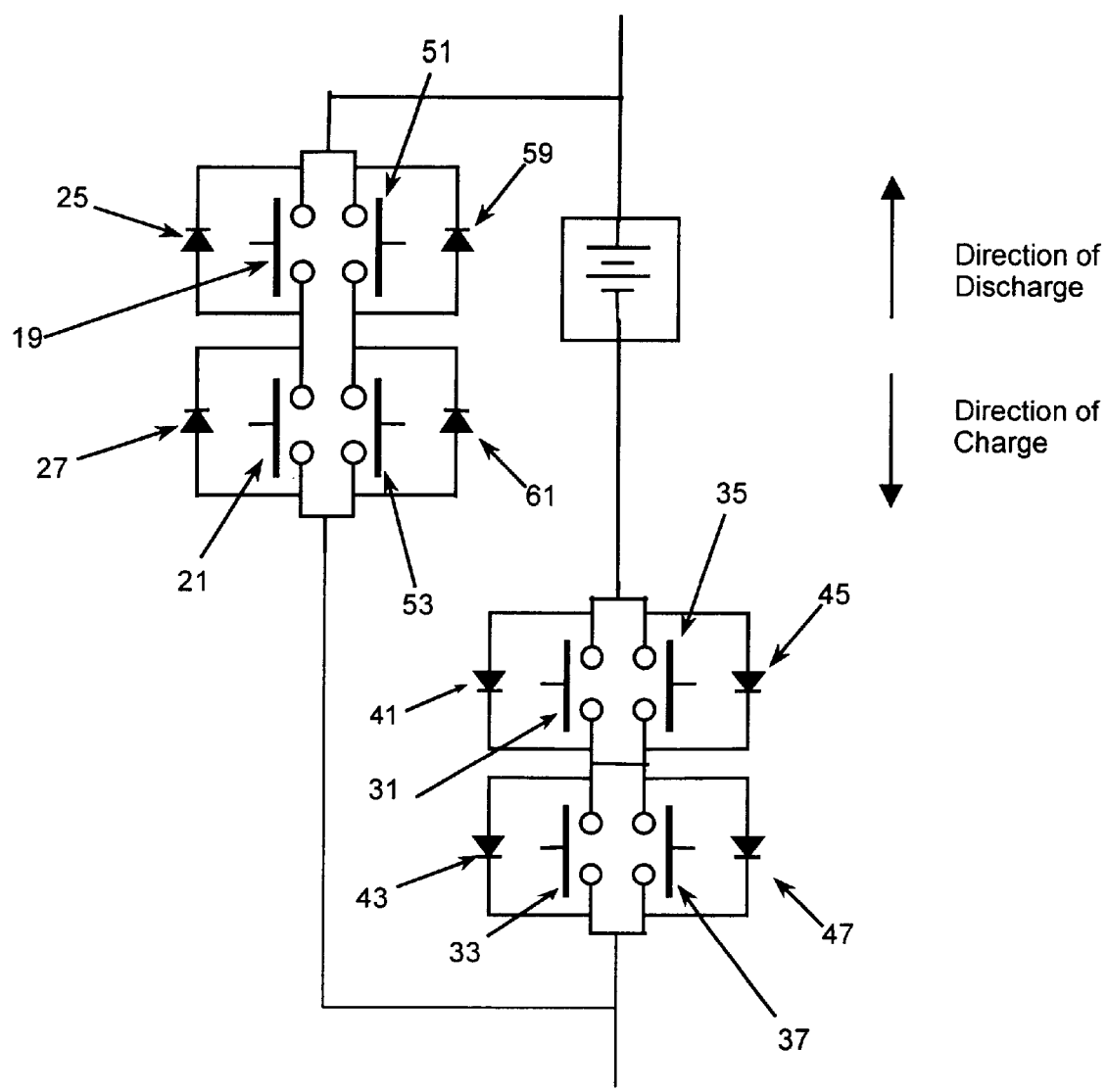
FIG. 2 is a schematic diagram depicting the detail of either a bypass circuit or an isolation circuit according to one embodiment of the present invention.

In still referring to FIG. 1, first, second and third isolation circuits 15, 16, 17 are associated with the first, second and third packs 30, 32, 34, respectively. More specifically, the first isolation circuit 15 is between the negative terminal of the first pack 30 and the positive terminal of the second pack 32. The second isolation circuit 16 is between the negative terminal of the second pack 32 and the positive terminal of the third pack 34. The third isolation circuit 17 is between the negative terminal of the third pack 34 and ground 11. The isolation circuits 15, 16, 17 each comprise a series-parallel combination of relays, as shown in FIGS. 1 and 2 and further described below. FIG. 1 represents one aspect of the isolation circuit with isolation circuit 17 between the last battery pack 34 and ground 11. Another aspect would have isolation circuit 17 between the first battery pack 30 and the spacecraft load 10. The isolation circuits 15, 16, 17 function to electrically isolate, when desired, each of the packs 30, 32, 34 from one another.

Also associated with and across each of the packs 30, 32, 34 are first, second and third bypass circuits 46, 48, 49, respectively. The bypass circuits 46, 48, 49 each comprise a series-parallel combination of relays, as shown in FIGS. 1 and 2 and further described below. These bypass relays enable a current discharged by the battery 14 or a charge current applied to battery 14 to bypass each of the packs 30, 32, 34, whichever pack is being reconditioned. Thus, with one pack isolated from the others and the battery current bypassing the isolated pack, the isolated and bypassed pack can be reconditioned while the remaining packs are on-line providing current to the load 10, as more fully described below.

The isolation circuits 15, 16, 17 each include parallel series switches 31, 33, 35, 37 and the bypass circuits 46, 48, 49 each include parallel series switches 19, 21, 51, 53 (FIG. 2) to protect against a single switch failure. Also, isolation circuits 15, 16, 17 each include diodes 41, 43, 45, 47 and bypass circuits 46, 48, 49 each include diodes 25, 27, 59, 61 (FIG. 2). The diodes provide additional protection against losing total battery power should a pair of parallel isolation relays open, either relay pair 31 and 35 or relay pair 33 and 37, thereby disconnecting the battery from powering the spacecraft load 10. Should either of these relay pairs open, diodes 25, 27, 59, 61 provide a discharge current path to support spacecraft load 10 and diodes 41, 43, 45, 47 provide a charge current path. The isolation circuits 15, 16, 17 and the bypass circuits 46, 48, 49 switches are controlled by relay circuitry 22 in response to commands from the onboard transceiver 58.

In referring again to FIG. 1, first, second and third reconditioning circuits 26, 28, 29 are associated with the first, second and third packs 30, 32, 34, respectively. The reconditioning circuits 26, 28, 29 function to discharge their respective battery packs. The reconditioning circuits 26, 28, 29 include first, second and third reconditioning switches 36, 38, 39, respectively, that connect first, second and third reconditioning resistors 60, 62, 64, respectively, across positive and negative terminals of the packs. The reconditioning switches 36, 38, 39 are controlled by the relay circuitry 22 in response to commands from the onboard transceiver 58.

It can be understood that the present invention also provides a method of reconditioning the packs 30, 32, 34 of the single battery 14. In general, the steps or acts of the present invention pertains to electrically, in series connected packs 30, 32, 34. Step 1: A pack is selected for reconditioning and the isolation circuit 15, 16, 17 associated with the selected pack is opened to electrically isolate the selected pack from the other packs not being reconditioned. Step 2: Closing the bypass circuit 46, 48, 49 associated with the pack to be reconditioned provides a path for a discharge or charge current around the one pack to be reconditioned. In other words, the remaining packs are left on-line to produce a discharge current that passes to the load 10 or are recharged by current from charge controller 18. Step 3: The reconditioning circuit 26, 28, 29 associated with the pack to be reconditioned is closed. The associated reconditioning circuit causes the selected pack to discharge to a selected level. Step 4: When the selected level is reached, the associated reconditioning circuit is opened. Step 5: The reconditioned pack is recharged. This can be accomplished in more than one way, two of which are described here. Step 5 (alternative 1): The associated bypass circuit is opened, and the associated isolation circuit is closed. Thereby, the selected pack can be charged by charge controller 18 along with the other packs. Step 5 (alternative 2): A dedicated battery charge circuit 76 is used to recharge the isolated reconditioned pack to the level of the other battery packs. Each battery pack can be connected to a single dedicated charge controller via relays 70, 72, 74 or each battery pack can have its own dedicated charge circuit, one charge circuit for each battery pack. When the reconditioned pack is recharged the bypass circuit is opened and the associated isolation circuit is closed.

To recondition more than a single pack 30, 32, 34, the packs can be sequentially electrically isolated from one another. The sequential isolation can occur in succession by immediately adjacent packs or without succession by immediately adjacent packs. Thus, as an illustration, the first pack 30 can be isolated and reconditioned, followed by the isolation and recondition of the second pack 32, and last by the isolation and recondition of the third pack 34. Alternatively, the second pack 32 can be isolated and reconditioned, followed by the first pack 30, and then the third pack 34.

During such sequential reconditioning, it can be seen that the method of the present invention also includes the steps or acts of sequentially bypassing each pack 30, 32, 34, whether in succession by immediately adjacent packs or without succession by immediately adjacent packs. Further, there is a step of sequentially discharging each pack either in succession by immediately adjacent packs or without succession by immediately adjacent packs. Also, there is a step or act of concurrently recharging each of the packs.

In operation of the present invention, an illustration would include allowing the battery 14 to discharge during a normal mission eclipse to bring down the overall battery state-of-charge. Via the relay circuitry 22, the battery 14 is commanded to a charge rate of 0 amps. A determination is made of there being adequate sun on the solar cell array 12 so that the battery 14 is not discharging current. A pack is selected to be reconditioned. The isolation circuit 15, 16, 17 associated with the selected pack is opened via the switches 31, 33, 35, 37. The bypass circuit 46, 48, 49 associated with the selected pack is closed via the switches 19, 21, 51, 53. The battery 14 is then commanded to a charge rate determined by the needs of the mission. The reconditioning circuit 26, 28, 29 associated with the selected pack is closed to begin reconditioning via the respective reconditioning resistor 60, 62, 64. The selected pack is discharged to a predetermined voltage. Thereupon, the reconditioning circuit of the selected pack is opened.

Next, a verification is made that the battery 14 has completed an eclipse discharge cycle and that the battery 14 needs to be high rate charged, i.e., all packs 30, 32, 34 are at a low charge state and will accept charge without driving the non-reconditioned packs into overcharge. The battery 14 is charged to a rate of 0 amps. Another determination is made of there being adequate sun on the solar cell array 12 so that the battery 14 is not discharging current. For the selected pack above that has been reconditioned, open the associated bypass circuit and close the associated isolation circuit. The battery 14 is then commanded to a high rate charge.

Just prior to entering an eclipse, and for the reconditioned pack above, the steps of commanding the battery 14 to a charge rate of 0 amps, determining whether there is adequate sun, opening the isolation circuit, and closing the bypass circuit is repeated. Just after exiting an eclipse, the steps of verifying the need for a high charge rate, commanding the charge rate to 0 amps, determining the adequacy of sun, opening the bypass circuit, closing the isolation circuit and commanding the battery to a high charge rate is repeated. The foregoing steps can be repeated until the reconditioned pack reaches a desired state of charge.

Even though the present invention has been described in terms of reconditioning packs of a single battery, the scope of the present invention is not so limited. Rather, the present invention also contemplates that the cells which comprise a single pack can be reconditioned in the same manner as the packs of a battery. Thus, a plurality of cells can be arranged in series and formed into packs in series. A single cell can be electrically isolated with an isolation circuit, bypassed with a bypass circuit, discharged with a reconditioning circuit, and then charged.

For those skilled in the art, it can be appreciated that the present invention provides a reconditionable battery and method of reconditioning needed wherein one pack of the battery can be reconditioned while the remaining packs are left on-line to provide current to a load. Also provided by the present invention is a reconditionable battery and method of reconditioning that is low in cost and simple in manufacturing. Further provided by the present invention is reconditionable battery and method of reconditioning that is effective for space vehicles, particularly ones in LEO.

It should be understood, of course, that the foregoing relates to preferred embodiments of the invention and that modifications may be made without departing from the spirit and scope of the invention as set forth in the following claims.

We claim:

1. A method of reconditioning a battery having a plurality of cells, comprising:

electrically connecting said plurality of cells in series;

electrically isolating one of said cells;

bypassing a current produced by said battery around said one of said cells;

discharging said one of said cells; and recharging said one of said cells.

2. The method of claim 1, further comprising passing said current from at least another of said cells to an electrical load while discharging said one of said cells.

3. The method of claim 1, further comprising sequentially isolating and bypassing said current around each cell in said plurality of cells.

4. The method of claim 1, further comprising sequentially discharging each cell in said plurality of cells.

5. The method of claim 1, further comprising grouping said plurality of cells into a plurality of packs.

6. The method of claim 5, further comprising electrically connecting said packs in series.

7. The method of claim 6, further comprising bypassing said current around at least one of said packs.

8. The method of claim 7, further comprising discharging another of said packs while bypassing said at least one of said packs.

9. A method of reconditioning a battery having a plurality of cells in a plurality of packs, comprising:

electrically connecting said plurality of packs in series;

bypassing a current produced by said battery around one of said packs;

discharging said one of said packs;

passing said current from at least another of said packs to an electrical load while discharging said one of said packs; and recharging said one of said packs.

10. The method of claim 9, further comprising electrically isolating said one of said packs from said at least another of said packs.

11. The method of claim 10, further comprising sequentially electrically isolating each pack in said plurality of packs.

12. The method of claim 11, wherein the step of sequentially isolating occurs in succession by immediately adjacent packs or without succession by immediately adjacent packs.

13. The method of claim 9, further comprising sequentially bypassing each pack in said plurality of packs.

14. The method of claim 13, wherein the step of sequentially bypassing occurs in succession by immediately adjacent packs or without succession by immediately adjacent packs.

15. The method of claim 9, further comprising sequentially discharging each pack in said plurality of packs.

16. The method of claim 15, wherein the step of sequentially discharging occurs in succession by immediately adjacent packs or without succession by immediately adjacent packs.

17. The method of claim 9, further comprising concurrently recharging each pack in said plurality of packs.

18. The method of claim 17, wherein the step of concurrently recharging occurs after discharging said one of said packs.

19. The method of claim 9, wherein said battery is in a terrestrial vehicle or a non-terrestrial vehicle.

20. A method of powering a space vehicle, comprising:

generating power from solar cells when said vehicle receives sunlight; and generating power from a single battery when said vehicle cannot receive sunlight, said battery including:
 a plurality of packs in series;
 an isolation circuit associated with at least one of said packs;
 a bypass circuit associated with said at least one of said packs; and
 a reconditioning circuit associated with said at least one of said packs.

21. The method of claim 20, wherein said space vehicle is operated in a low earth orbit.

22. A reconditionable battery having a plurality of cells in series, comprising:

an isolation circuit associated with at least one of said cells;

a bypass circuit associated with said at least one of said cells; and a reconditioning circuit associated with said at least one of said cells.

23. The battery of claim 22, wherein said isolation circuit electrically isolates said at least one cell from another cell in said plurality of cells.

24. The battery of claim 22, wherein said bypass circuit electrically bypasses a current from another cell in said plurality of cells and around said at least one cell.

25. The battery of claim 22, wherein said reconditioning circuit discharges said at least one cell.

26. The battery of claim 22, wherein said plurality of cells in series comprise a plurality of packs in series.

27. A reconditionable battery having a plurality of cells in a plurality of packs in series, comprising:

an isolation circuit associated with at least one of said packs;

a bypass circuit associated with said at least one of said packs; and a reconditioning circuit associated with said at least one of said packs.

28. The battery of claim 27, wherein said isolation circuit comprises a switch between a negative terminal of said at least one pack and a positive terminal of another of said packs.

29. The battery of claim 27, wherein said bypass circuit comprises a switch across a positive terminal and a negative terminal of said at least one pack.

30. The battery of claim 27, wherein said reconditioning circuit comprises a switch and a resistor across a positive terminal and a negative terminal of said at least one pack.

31. The battery of claim 27, further comprising a plurality of isolation circuits respectively associated with each of said packs.

32. The battery of claim 27, further comprising a plurality of bypass circuits respectively associated with each of said packs.

33. The battery of claim 27, further comprising a plurality of reconditioning circuits respectively associated with each of said packs.

34. The battery of claim 27, wherein said battery is in a terrestrial vehicle or a non-terrestrial vehicle.

* * * * *